US012771220B2

(12) United States Patent
Corbinelli et al.

(10) Patent No.: US 12,771,220 B2
(45) Date of Patent: Oct. 20, 2026

(54) TRANSFER UNIT FOR TRANSFERRING CONDUCTIVE ELEMENTS, AND CORRESPONDING METHOD

(71) Applicant: ATOP S.P.A., Barberino (IT)

(72) Inventors: Rubino Corbinelli, Poggibonsi (IT); Maurizio Mugelli, Barberino (IT)

(73) Assignee: ATOP S.P.A., Barberino (IT)

( * ) Notice: Subject to any disclaimer, the term of this patent is extended or adjusted under 35 U.S.C. 154(b) by 249 days.

(21) Appl. No.: 18/707,794

(22) PCT Filed: Oct. 27, 2022

(86) PCT No.: PCT/EP2022/080039
§ 371 (c)(1),
(2) Date: May 6, 2024

(87) PCT Pub. No.: WO2023/078767
PCT Pub. Date: May 11, 2023

(65) Prior Publication Data

US 2025/0015689 A1 Jan. 9, 2025

(30) Foreign Application Priority Data

Nov. 8, 2021 (IT) ........................ 102021000028328

(51) Int. Cl.
*H02K 15/064* (2025.01)
*B21D 43/00* (2006.01)
(Continued)

(52) U.S. Cl.
CPC ........... *H02K 15/064* (2013.01); *B21D 43/00* (2013.01); *B25J 9/0096* (2013.01); *B25J 9/1687* (2013.01);
(Continued)

(58) Field of Classification Search
CPC ..... H02K 15/064; B21D 43/00; B25J 9/0096; B25J 9/02; B25J 9/023; B25J 9/04; B25J 9/1035; B25J 9/1687
See application file for complete search history.

(56) References Cited

U.S. PATENT DOCUMENTS 9,871,430 B2 * 1/2018 Ohno .................. H02K 15/064
2011/0036898 A1 2/2011 Lagerkvist
(Continued)

FOREIGN PATENT DOCUMENTS

DE 102019204379 A1 10/2020
EP 2164684 B1 3/2010

OTHER PUBLICATIONS

Italian Search Report for Italian Application No. IT102021000028328 completed on Jun. 23, 2022.
(Continued)

*Primary Examiner* — Michael Mccullough
*Assistant Examiner* — Jessica L Burkman
(74) *Attorney, Agent, or Firm* — Carlson, Gaskey & Olds, P.C.

(57) ABSTRACT

A transfer unit for transferring conductive elements, which is configured to pick up a conductive element from a delivery station and to move it until at least one portion of interest thereof is inserted into a specific destination slot provided in a collection tool that is provided with a plurality of slots arranged according to a predefined distribution. The unit comprises at least:
- a first locking clamp, which is actuated by a movement apparatus and is configured to pick up and retain the conductive element;
- a rotating arm, configured to move the first clamp about a main rotation axis at least between a first position and a second position.

(Continued)

The first locking clamp is mounted on a linear movement device which is configured to translate along a sliding direction, which lies on a plane perpendicular to the rotation axis.

14 Claims, 10 Drawing Sheets

(51) Int. Cl.
*B25J 9/00* (2006.01)
*B25J 9/02* (2006.01)
*B25J 9/04* (2006.01)
*B25J 9/10* (2006.01)
*B25J 9/16* (2006.01)

(52) U.S. Cl.
CPC .................. *B25J 9/023* (2013.01); *B25J 9/04* (2013.01); *B25J 9/1035* (2013.01)

(56) References Cited

U.S. PATENT DOCUMENTS

| | | | |
|---|---|---|---|
| 2019/0296622 | A1 | 9/2019 | Ueno et al. |
| 2020/0343797 | A1 | 10/2020 | Takeda et al. |
| 2021/0323140 | A1 | 10/2021 | Brackett et al. |

OTHER PUBLICATIONS

International Search Report and Written Opinion for International Application No. PCT/EP2022/080039 completed on Jan. 20, 2023.

* cited by examiner

TRANSFER UNIT FOR TRANSFERRING CONDUCTIVE ELEMENTS, AND CORRESPONDING METHOD

The present invention relates to a transfer unit for transferring conductive elements, for example of inductive coils, and the corresponding method.

As is known, the stator of an electric motor or of an electricity generator (and/or of other rotating electric machines) comprises a ferromagnetic core and a plurality of coils or windings (inductive), which are arranged according to various geometries with respect to the core. A current circulating in at least one coil can determine, by electromagnetic induction, the circulation of an induced current in at least one other spool. Furthermore, with reference for example to an electric motor, forces develop between the stator and the rotor which are capable of turning the rotor.

According to a consolidated technique for manufacturing stators, the coils are made up of a plurality of (electrically) conductive elements which are inserted separately into respective slots provided in the core of the stator and then welded to each other at the ends, in order to form the coils according to the desired configuration.

Such substantially wire-like elements can be straight or undulating or they can take other shapes, of which one is particularly widely used in which they are substantially folded into a U-shape, thus taking on a forked shape composed of two straight tines connected by a transverse bridge (in turn typically bent into a U-shape or a V-shape). When it assumes this last configuration, the element is identified using the English term “hairpin” and it is coupled to the core by inserting each tine into a corresponding slot of the core.

In any case, for all the shape structures mentioned above (and/or for yet others), conventional production and assembly lines of stators typically comprise devices that cut the elements from a respective skein and then give them the desired shape.

Subsequently, a suitably-actuated anthropomorphic robot, capable of moving a clamp freely in space according to any programmable law of motion, takes over and grips the element delivered by the devices upstream, and then moves it until it is inserted into the slots (or slot) of a model (or basket) below that replicates the distribution of the slots of the destination stator.

Using the robot makes it possible to ensure the line is adequately versatile: when the dimensions and/or shape of the element to be moved vary, it is sufficient to modify the law of motion imparted to the clamp in order to enable the correct operation.

Therefore, by iterating the method outlined above, all the elements that will go to make up the coils can thus be progressively deposited on the model, thus obtaining a pack arranged in the desired configuration; the pack is then slid out from the model and deposited in the corresponding slots of the core of the stator, in order to then proceed with the final steps of welding the elements (their terminal portions) and then with the final steps of production and/or assembly of the stator.

This embodiment is however not devoid of drawbacks.

It has been seen in fact that a crucial role is played by the anthropomorphic robot that moves each element and slides it (with suitable precision) into the slot or slots of the model. As is well known, such a device has a high cost and considerable bulk, two factors that evidently are increasingly unwelcome, when it is considered that the industry tends toward reduction of production costs (evidently influenced by the costs of the equipment used) and of the areas needed (in order to recover space in dedicated factory sheds or in order to be able to use other, smaller factory sheds).

It is even more important to emphasize that, although using a robot does make it possible, as mentioned, to ensure adequate versatility, on the other hand it often entails movement times for each element that are fairly lengthy and difficult to reconcile with the need to contain or reduce the cycle time, a need that is also easily found in the reference industrial context.

The aim of the present invention is to solve the above mentioned problems, by providing a transfer unit that makes it possible to optimally and quickly transfer conductive elements, for example of inductive coils, thus reducing the cycle time with respect to conventional solutions.

Within this aim, an object of the invention is to provide a method that makes it possible to optimally and quickly transfer conductive elements, for example of inductive coils, thus reducing the cycle time with respect to conventional solutions.

Another object of the invention is to provide a unit and a method that make it possible to pick up conductive elements and deposit them in a precise manner in adapted slots, with a solution that is economic and with contained space occupation.

Another object of the invention is to provide a unit and a method that ensure high reliability of operation and great versatility, by being able to be easily used for conductive elements that have different shapes or dimensions.

Another object of the invention is to provide a unit and a method that adopt an alternative technical and structural architecture to those of the conventional solutions.

Another object of the invention is to provide a unit and a method that are certain to be safe in use and which are easily obtained and implemented using elements and materials that are readily available on the market.

This aim and these and other objects which will become better apparent hereinafter are achieved by a unit according to claim 1 and by a method according to claim 10.

Further characteristics and advantages of the invention will become better apparent from the description of a preferred, but not exclusive, embodiment of the unit and the method according to the invention, which are illustrated by way of non-limiting example in the accompanying drawings wherein.

Figure 1:
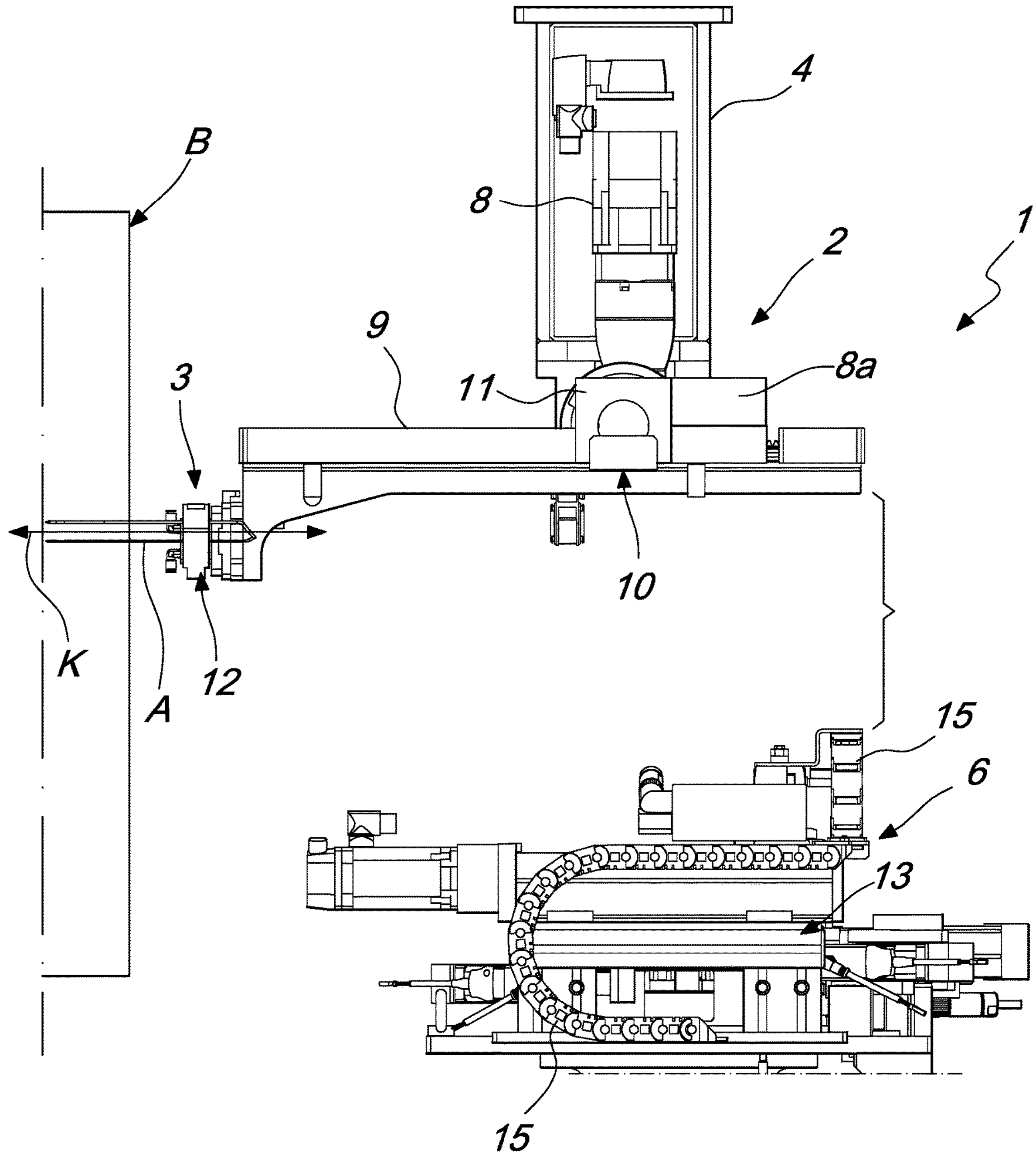
FIG. 1 is a side view of the unit according to the invention, in a first moment of the method of transfer.

With particular reference to the figures, the reference numeral 1 generally designates a transfer unit for transferring conductive elements A (typically, substantially wire-like), for example inductive coils.

It is emphasized that the present description (and the scope of protection claimed herein) relates not only to the unit 1, but also to a method 100 of transferring the conductive elements A, which can be carried out by the unit 1 (or optionally also in another way).

The unit 1 is configured to pick up a conductive element A from a delivery (and forming) station B and to move it until at least one portion of interest thereof is inserted into a specific destination slot C provided in a collection tool D that is provided with a plurality of slots C arranged according to a predefined distribution.

The preferred (but not exclusive) application of the unit 1 is intended to be in production and/or assembly lines for stators of electric motors, electricity generators and/or other rotating electric machines, in which in any case a plurality of (inductive) coils/windings is arranged according to a specific geometry with respect to a core made of ferromagnetic material.

However, the possibility is not ruled out of using the unit 1 in other contexts, where it is desired in any case to arrange a plurality of conductive elements A inside respective slots C, according to a predefined logic (in the ways that will be explained in the discussion below).

In general, in the present description the terms “inductive coils” or (inductive) “windings” are used to refer to the windings of electric machines (for example the stator or rotor winding of a rotating electric machine or the windings of a transformer) or other electrical windings designed to establish an inductive coupling with other windings or other components.

In such context therefore, the conductive elements A that the unit 1 transfers, are substantially conveniently shaped metallic filaments, rigid but, often, elastically flexible, which are intended to be coupled (welded) to each other at respective end sections (after having been suitably inserted into the core) so as to form windings.

The tool D is typically a model or basket in which the predefined distribution of the slots C is similar to that of the ferromagnetic core (for example of the stator) on which it is desired to make the inductive winding: after using the unit 1 to transfer the elements A into all of the destination slots C, the pack of elements A is picked up (maintaining the geometry obtained) and they are accommodated in the slots of the ferromagnetic core (for example of the stator), in order to then proceed with the welding and in general with the envisaged subsequent activities.

It should be noted that the unit 1 can transfer elements A of any type, while remaining within the scope of protection claimed herein: as will become clear from the description that follows, the operating logic and the technical ways with which the transfer is achieved are irrespective of the shape and dimensions of the element A.

Likewise, in the preferred embodiment, illustrated in the accompanying figures for the purposes of non-limiting example of application of the invention, the conductive element A is shaped like a fork comprising a first segment A' and a second segment A" (like tines or prongs) which are connected by a transverse connecting bridge (which can be straight or in turn V-shaped or otherwise shaped) and are arranged substantially mutually parallel. As is known, such type of conductive element A in the sector is identified using the English term “hairpin”.

Figure 10:
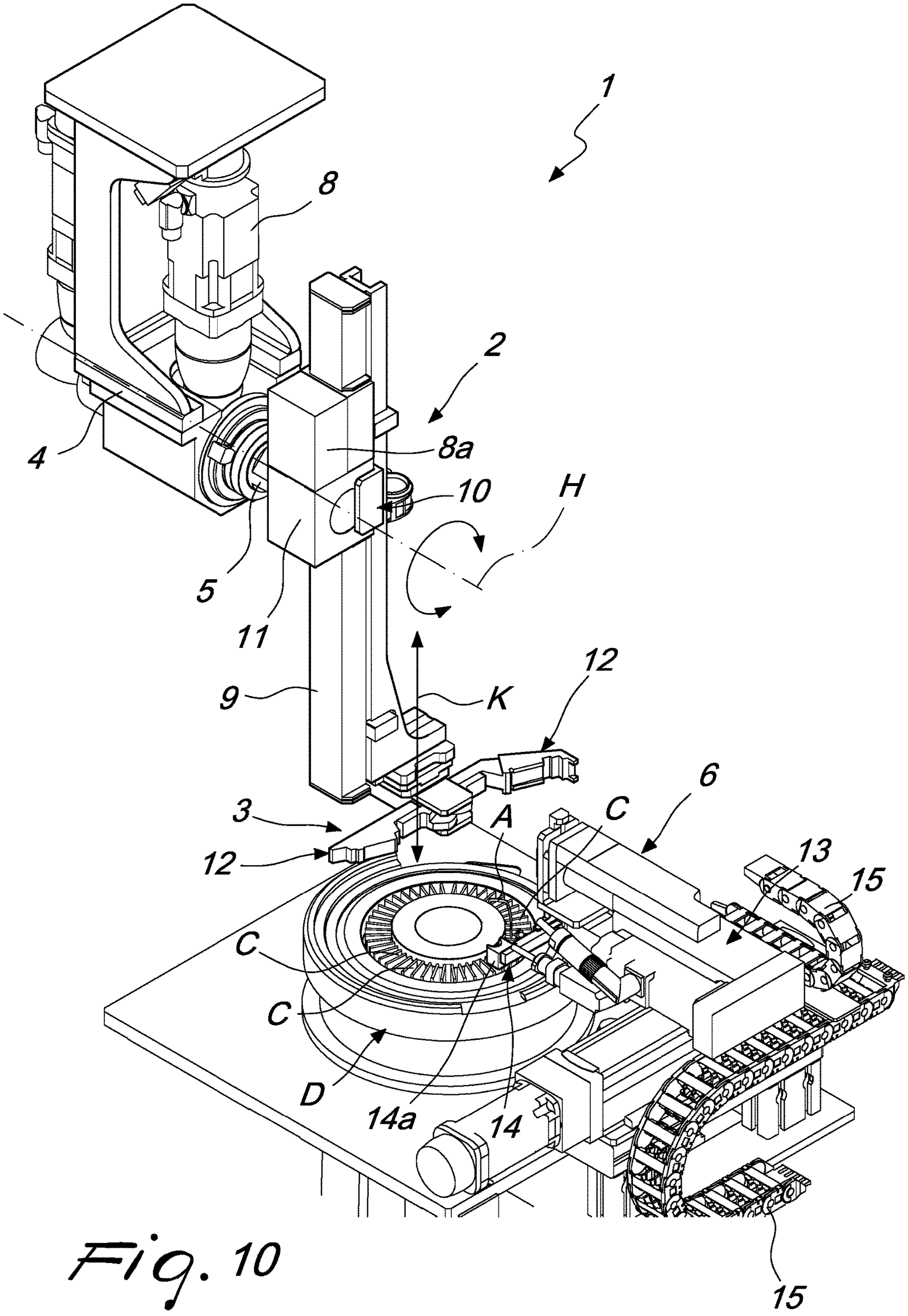
FIG. 10 is a perspective view of the unit of FIG. 1, in a sixth moment of the method of transfer.
Figure 11:
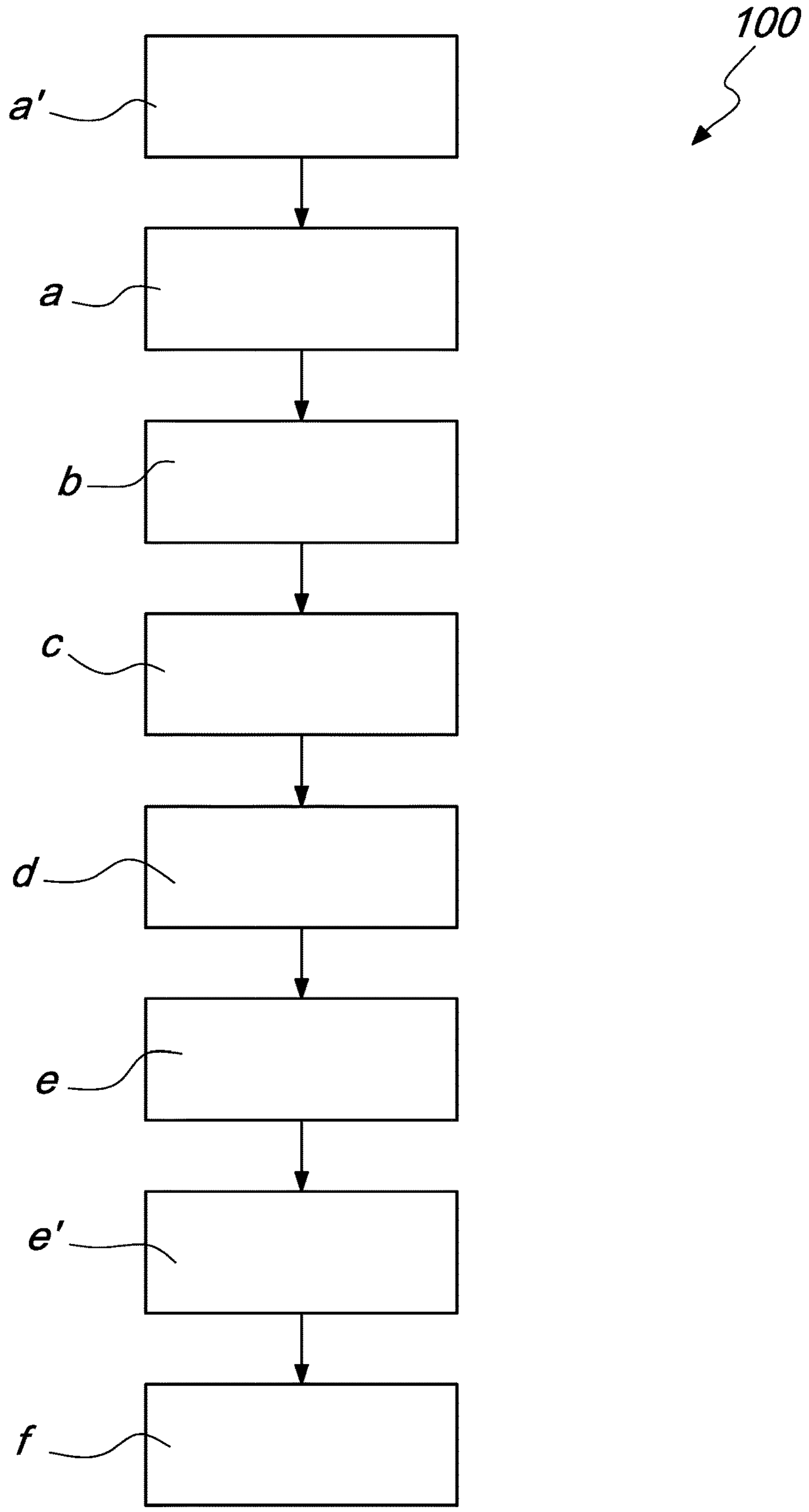
FIG. 11 is a block diagram of the method according to the invention.

In this embodiment, as clearly shown in FIG. 10, the objective of the unit 1 (and of the method 100) according to the invention is to insert (completely or partially) each tine into a corresponding slot C, while leaving the transverse bridge protruding externally (there are therefore two affected portions, the tines, to be inserted into respective slots C).

In any case it should be noted that the scope of protection claimed herein extends to conductive elements A of any form: they can be constituted by straight wires or wires bent in various ways, or something else; for example, the conductive element A can be of the type known as an “I-pin”, which effectively is a kind of hairpin with a single tine (or prong). In such case in fact, the unit 1 will insert only a portion of interest (the single tine or a part thereof) into a respective destination slot C.

The unit 1 comprises a first locking clamp 3, which is actuated by a movement apparatus 2 and which is configured to pick up and retain the conductive element A (if the conductive element A is a hairpin, the first clamp 3 typically grips it at one of its tines).

Figure 2:
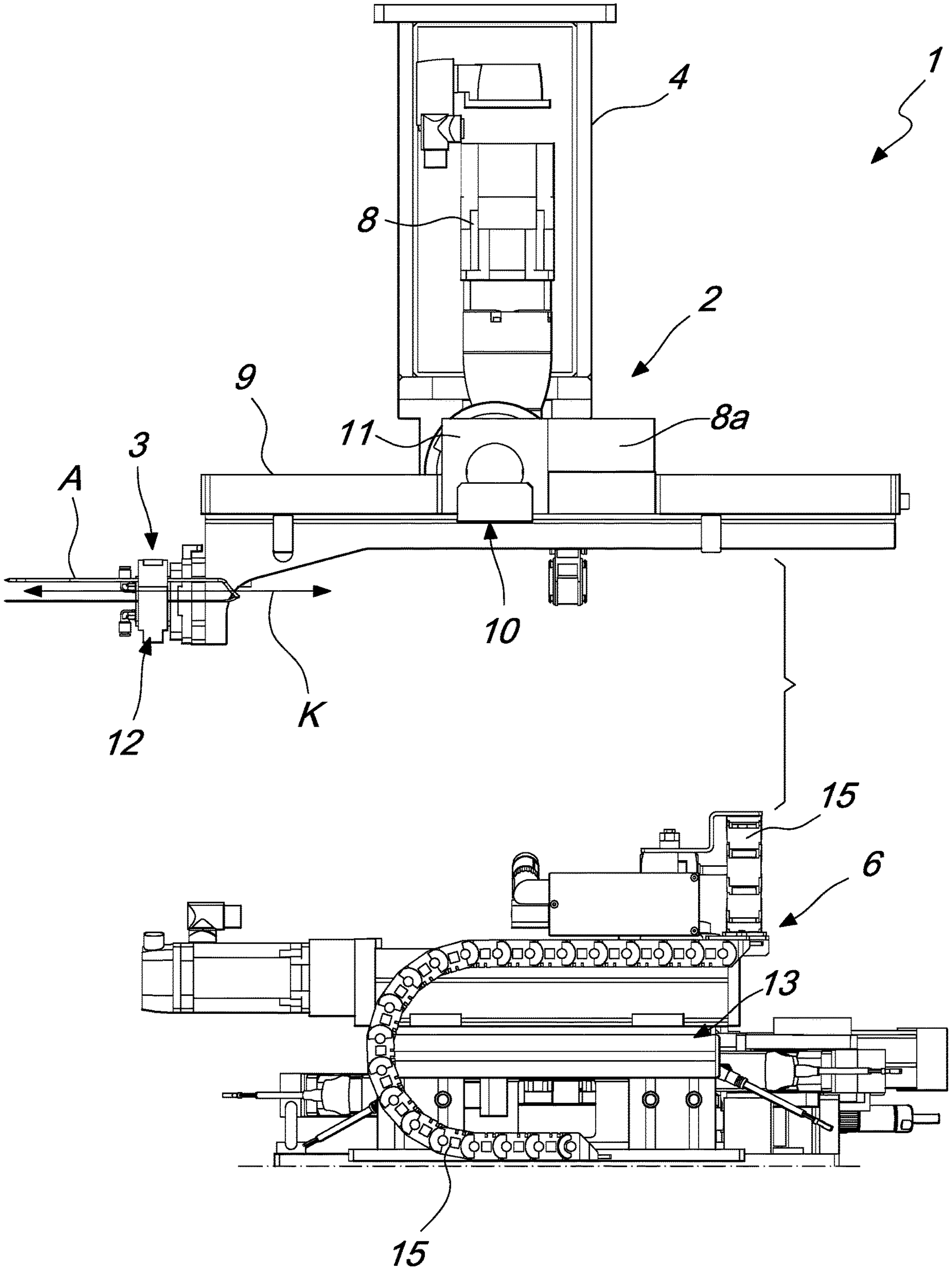
FIG. 2 is a side view of the unit of FIG. 1, in a second moment of the method of transfer.
Figure 3:
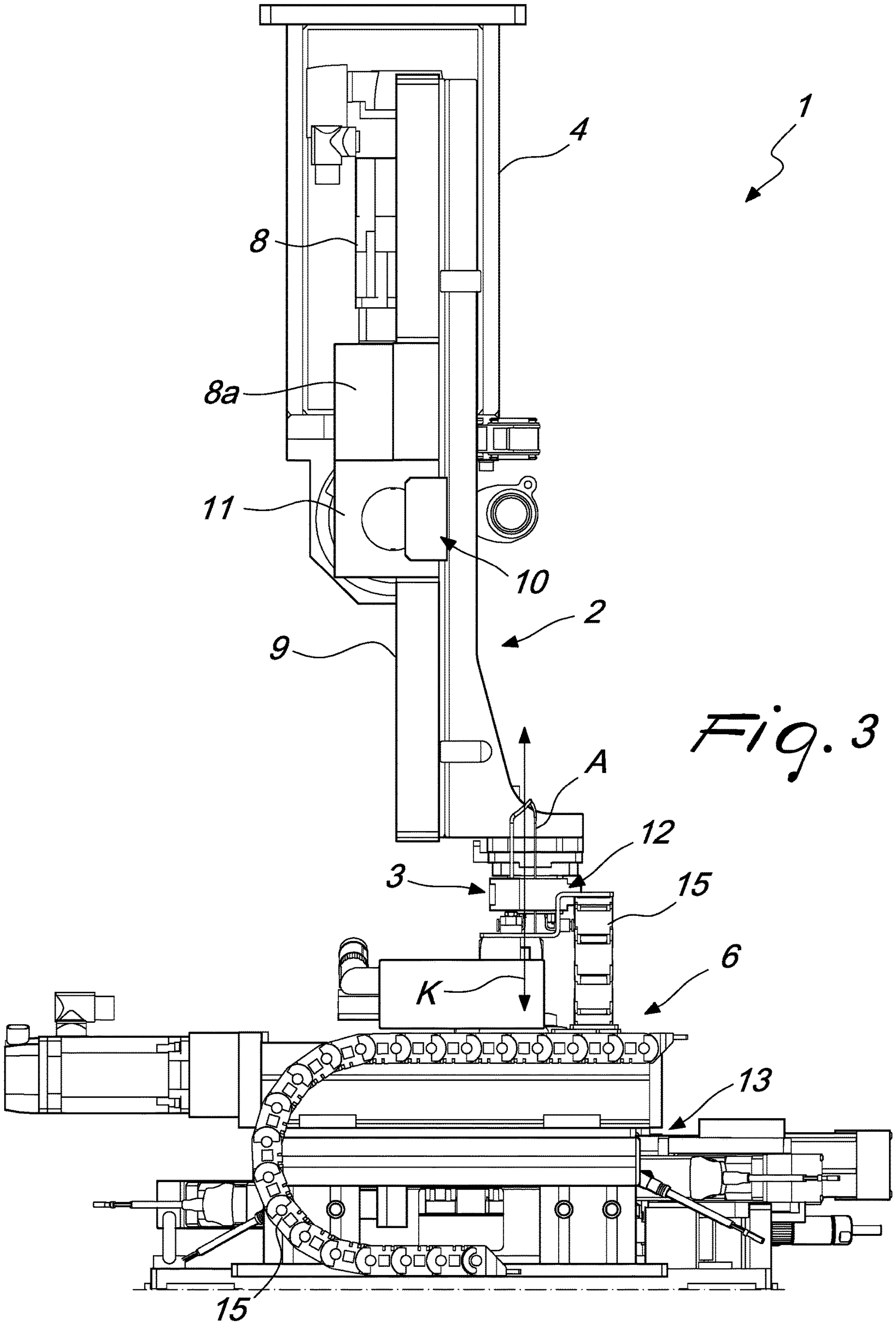
FIG. 3 is a side view of the unit of FIG. 1, in a third moment of the method of transfer.
Figure 4:
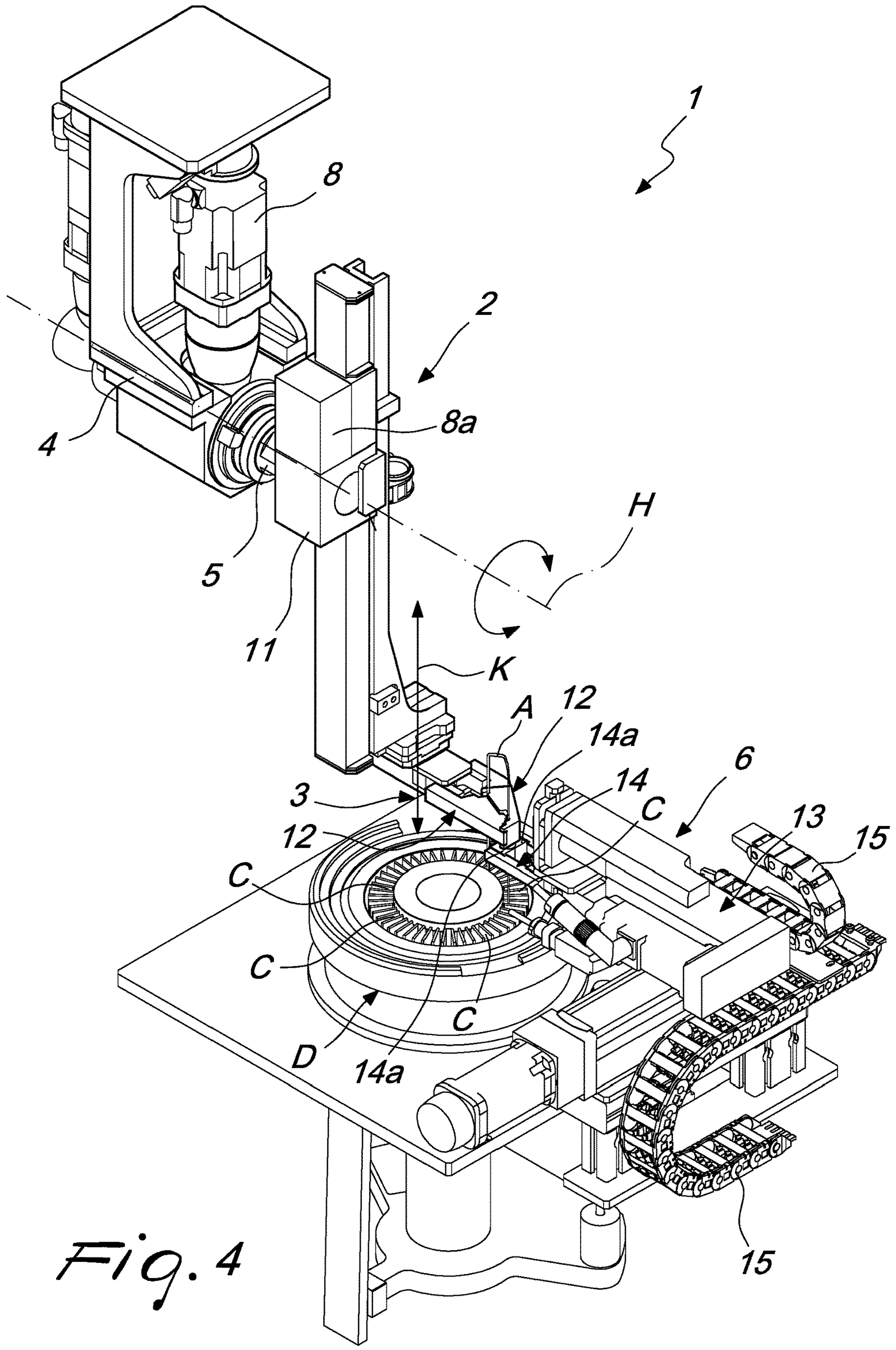
FIG. 4 is a perspective view of the unit of FIG. 1, in a fourth moment of the method of transfer.
Figure 7:
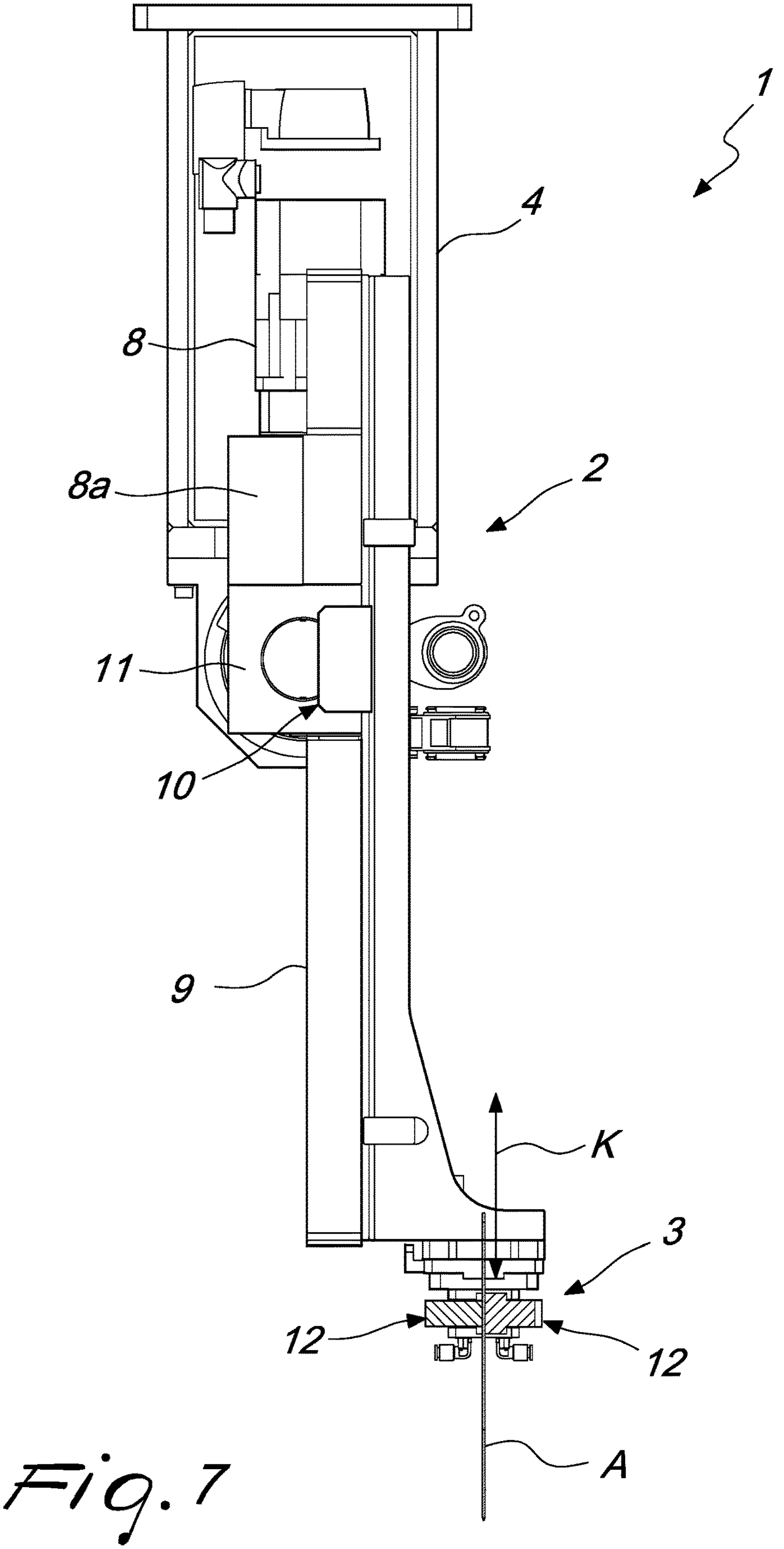
FIG. 7 shows the apparatus and the first clamp of the unit according to the invention, in the configuration of FIG. 4 and with the first clamp shown in cross-section taken along a plane perpendicular to the resting surface.
Figure 8:
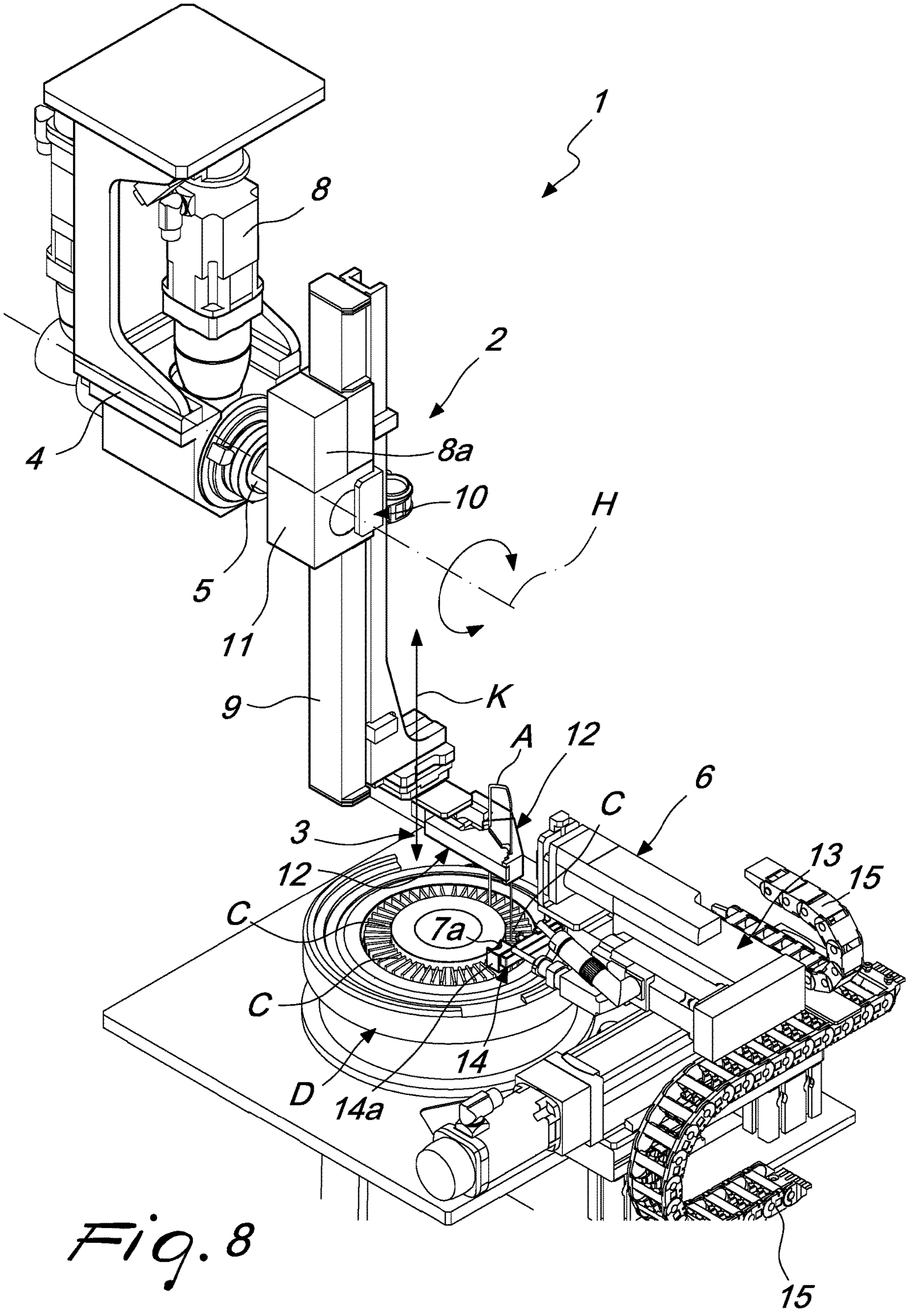
FIG. 8 is a perspective view of the unit of FIG. 1, in a fifth moment of the method of transfer.
Figure 9:
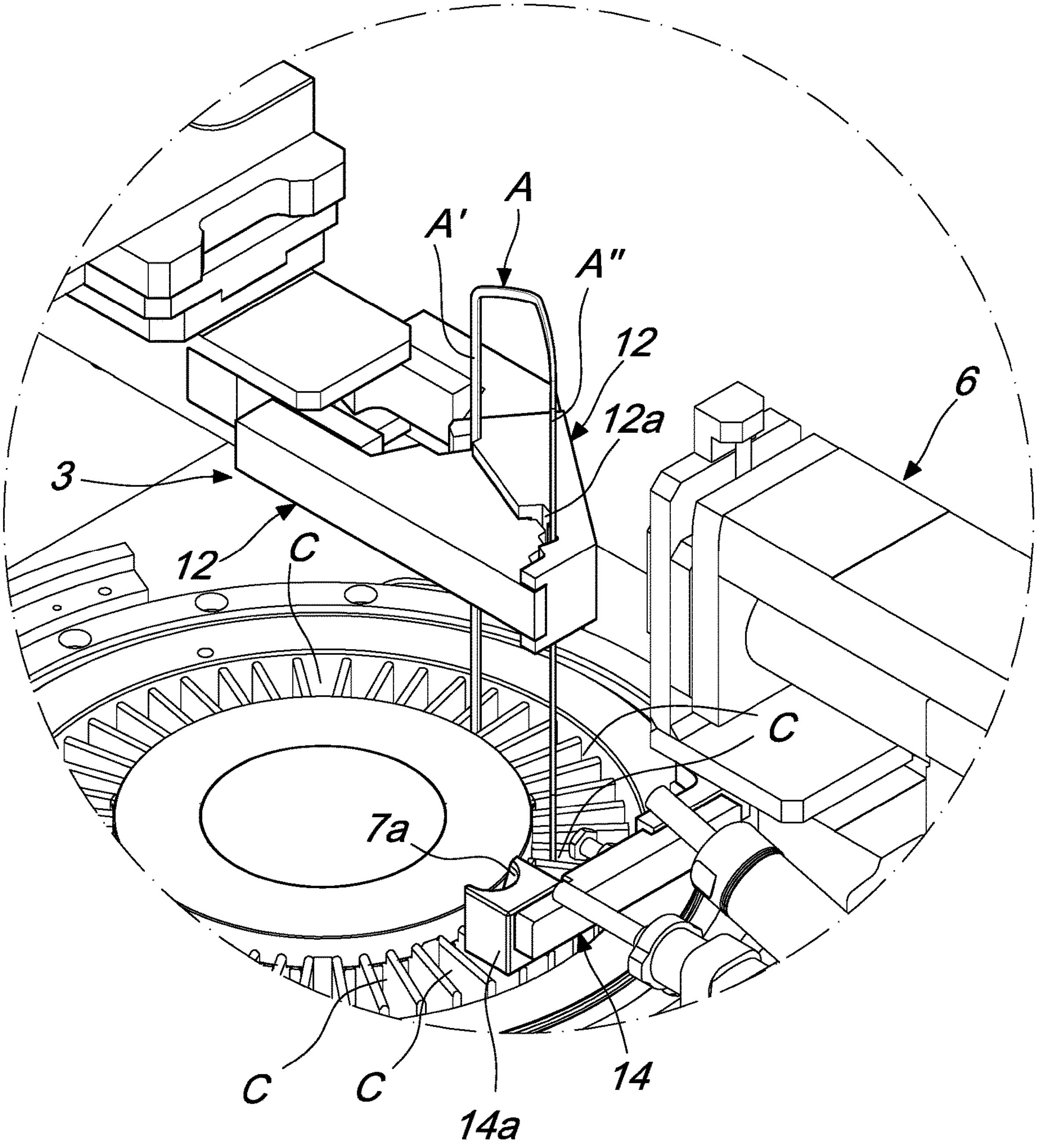
FIG. 9 is a greatly enlarged detail of FIG. 8.

Furthermore, the unit 1 comprises a rotating arm 5, which is configured to move the first clamp 3 about a main rotation axis H at least between a first position (in which the arm 5 and the components supported by it are shown in FIGS. 1 and 2) and a second position (FIGS. 3, 4, 7, 8 and 10). The rotation axis H (and the directions of rotation that it identifies) are shown in FIGS. 4, 8 and 10.

In particular, it is possible for the apparatus 2 to comprise a supporting frame 4 (direct or indirect support) for the arm 5.

The first position is chosen so that when the arm 5 assumes it, the first clamp 3 is located proximate to the delivery station B; likewise, in the second position the first clamp 3 is located proximate to the collection tool D.

According to the invention, the first locking clamp 3 is mounted on a linear movement device 9 which is configured to translate along a sliding direction K, which lies on a plane perpendicular to the rotation axis H.

Usefully, in the preferred embodiment, the rotation axis H is fixed.

It is emphasized that the sliding direction K is not determined solely with respect to the outside environment and/or, for example, with respect to the ideal resting plane of the unit 1 (with respect to the ground and/or to the floor): it depends on the orientation assumed by the arm 5 as a consequence of its rotation about the main axis H. As shown in the figures in fact, and considering that the extent of the rotation required in order to move between the two positions is chosen preferably to be 90°, when the arm 5 is in the first position the sliding direction K (the translation of the first locking clamp 3) is horizontal (FIGS. 1 and 2), while in the second position it is vertical (FIGS. 3, 4, 7, 8 and 10).

Effectively in any case, by virtue of a suitable arrangement of the components involved and therefore by virtue of the combination of a rotary motion (about the main axis H) and of a translation motion (along the sliding direction K), therefore giving the first locking clamp 3 only two degrees of freedom, it is possible to transfer the conductive element A from the delivery station B to the specific destination slot(s) C.

In more detail, the components involved are dimensioned and positioned so that the rotation between the first position and the second position enables the first clamp 3 respectively to be aligned with the conductive element A (still held by the delivery station B) and with the destination slot(s) C (in order to deposit the conductive element A therein), in order to be able to pick up and insert the conductive element A via simple translations along the sliding direction K.

In this context, the plane perpendicular to the rotation axis H along which the first locking clamp 3 performs a translational motion is chosen to also contain the position in which the conductive element A is made available to the unit 1 by the delivery station B and a destination slot C.

In the preferred embodiment, furthermore, the unit 1 comprises (at least) one guiding device 6, which can be arranged substantially along the sliding direction K (along the path that the sliding direction K identifies), when the arm 5 is arranged in the second position; the guiding device 6 is configured to guide the conveyance of the element A into the slot C of the collection tool D (and to favor the optimal insertion). Typically, but not exclusively, the guiding device 6 is responsible for conveying a second portion of the element A into a second destination slot C. In particular, the guiding device 6 comprises (or has) a funnel-shaped through duct 7 (FIGS. 5 and 6) for receiving a segment of the conductive element A (for example one of the segments A', A").

In more detail, in the preferred application, one tine of the hairpin-shaped conductive element A is clamped with the first locking clamp 3, and the through duct 7 is placed along the path of the other tine: thus, the insertion of the first tine is ensured by the first clamp 3, which ensures its certain position, while the guiding device 6 is responsible for optimally conveying the other tine (for insertion into another destination slot C).

If the conductive element A has a different shape, then the position of the duct 7 can be adapted as a consequence (for example in order to convey the segment already held by the first locking clamp 3, if this is of interest) or simply move or temporarily remove the guiding device 6.

At the same time, for more complex shapes of conductive elements A, or in any case for particular requirements, the possibility is not ruled out of using two or more ducts 7 (and/or guiding devices 6).

The guiding device 6 therefore cooperates with the apparatus 2 and the first locking clamp 3 in order to achieve the set aim more effectively: with only two degrees of freedom available to the first clamp 3 it is possible to pick up a hairpin or other conductive element A from a delivery station B (which is responsible for its forming) and then insert it with at least one portion thereof into the destination slot C, in so doing achieving the desired aim; the guiding device 6 makes it possible to optimally convey the insertion of a second portion into another slot C, in particular guarding against the danger that small deviations in size of the components involved and/or an elastic oscillation of the element A might lead to errors in the step of inserting the tine, which is not actively held by the first locking clamp 3.

In the preferred embodiment, illustrated in the accompanying figures for the purposes of non-limiting example of the application of the invention, the apparatus 2 comprises a first drive unit 8, which is configured for the rotation of the arm 5, and a second drive unit 8*a*, independent of the first drive unit 8, which is configured for the translation of the linear movement device 9 (which can be a trolley for example), which is slideably coupled to the arm 5 and rigidly supports the first clamp 3. With further reference to the preferred embodiment, the linear movement device 9 (the trolley for example) is a form of profiled element arranged along the sliding direction K.

The first drive unit 8 (and the second) can be an actuator and/or a motor (electric or of other kind) of any type, according to the specific requirements and it can avail itself of systems of transmission and/or reduction which can be chosen from among conventional ones, according to the specific requirements.

The mutual independence of the first unit 8 and of the second in any case makes it possible to translate the first locking clamp 3 while the arm 5 is fixed (it does not rotate) and/or to rotate the latter while keeping the first clamp 3 immobile (integral with the arm 5).

In the accompanying figures (for the purposes of example) the first drive unit 8 comprises a vertical axis motor which is associated, via transmission systems that are not visible in the figure, to the arm 5.

In turn, the linear movement device 9 (the trolley, for example) is functionally associated with the second drive unit 8*a* via a gear system 10 of the type rack-and-sprocket type.

In more detail, the second drive unit 8*a* comprises an additional motor (not visible in the figure) which makes the sprocket (accommodated in a box 11) rotate and in turn mesh with the rack.

It should be noted however that any embodiment of the second drive unit 8*a* (and of the first) is included in the scope of protection claimed herein: in fact use can be made of linear induction motors, leadscrew couplings, pneumatic or hydraulic cylinders, etc.

In the preferred embodiment, illustrated in the accompanying figures for the purposes of non-limiting example of the invention, the first locking clamp 3 comprises a pair of first jaws 12, which can move with respect to each other between a first configuration, in which they are mutually spaced apart (such as for example in FIG. 10), and a second configuration (FIGS. 4-9, for example).

In the second configuration, the first jaws 12 (or at least respective limbs thereof) are brought closer together in order to clamp the conductive element A between them, or at least a first segment A' thereof (so for example, a section of one of the tines of the hairpin to be transferred). In the accompanying figures (see in particular FIGS. 5, 6 and 9), the tine clamped by the first jaws 12 is the left-hand one.

More specifically, if the conductive element A is shaped like a fork comprising a first segment A' and a second segment A", which are connected by a transverse connecting bridge and are arranged substantially mutually parallel, the inner profile of at least one of the first jaws 12 (and preferably of both), directed toward the other first jaw 12, has (at least) one recess that is adapted to define, in the second configuration, an accommodation compartment 12*a* that is configured to accommodate with play (FIGS. 5, 6 and 9) the second segment A" of the conductive element A (parallel to the first segment A'). The first segment A' of the conductive element A can in this context be clamped firmly between the first jaws 12. In other words, the recess is provided along the inner profile of at least one of the first jaws 12.

In these latter cases therefore, the first locking clamp 3 is responsible for firmly clamping the conductive element A (the hairpin) at one tine, while still keeping the other tine (the one on the right, in the accompanying figures) confined in the compartment 12*a*, which therefore identifies a well-defined area in which it is free to move. It is precisely on the latter tine that, typically, the guiding device 6 therefore operates.

Figure 5:
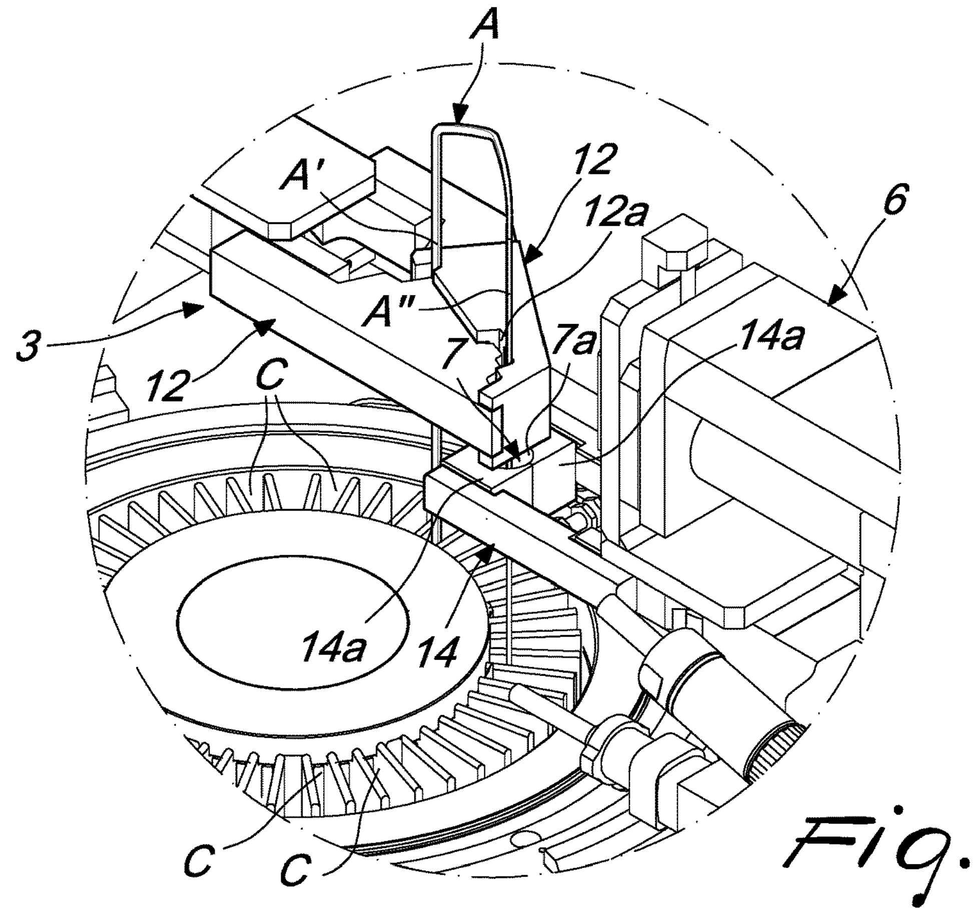
FIG. 5 is a greatly enlarged detail of FIG. 4.
Figure 6:
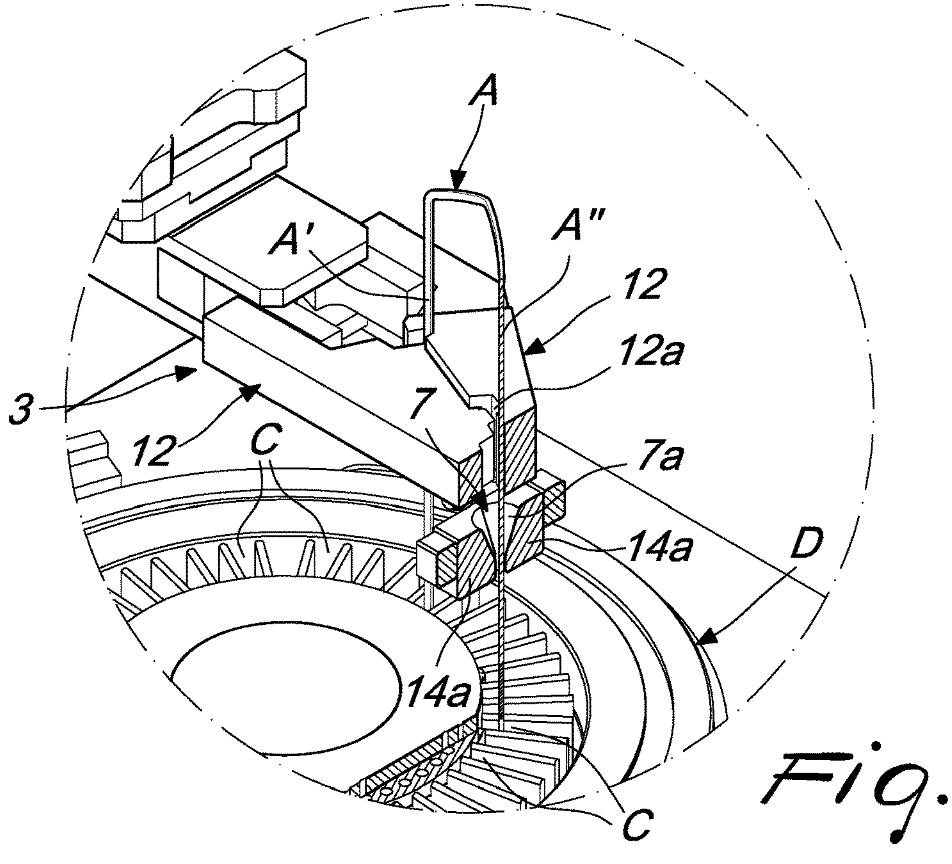
FIG. 6 is the detail of FIG. 5, with some components removed and others shown in cross-section taken along a plane perpendicular to the resting surface.

Usefully, the guiding device 6 comprises a supporting framework 13 for a second clamp 14, for conveyance, which comprises a pair of second jaws 14*a* which can move with respect to each other between a first arrangement, in which they are mutually spaced apart (FIGS. 8 and 9), and a second arrangement, in which they are arranged in mutual contact at least with respective active fractions (FIGS. 5-7). As can clearly be seen for example precisely from these figures, such active fractions comprise, along corresponding mutually facing inner profiles, contoured recesses 7*a* that are adapted jointly to define, in the second arrangement, the funnel-shaped through duct 7.

It should be noted that having chosen to define the duct 7 with the second jaws 14*a*, it is sufficient to move the latter between the two arrangements described above in order to obtain the conveyance of the segment of interest of the conductive element A into the slot C (in particular, the second tine of the hairpin, which is not actively clamped by the first clamp 3) and in order to instead allow (in the second arrangement) the free transit of the first locking clamp 3 when the conveyance is not required, such as for example occurs on the return stroke or if it is desired to complete the insertion into the slot(s) C by moving the first locking clamp 3 closer again. So by giving the collection tool D the capacity to rotate, in order to always face different slots C toward the stroke of the first locking clamp 3, it is not necessary to have the collection device 6 make further movements: such solution is therefore included in the scope of protection claimed herein.

In an embodiment of extreme practical interest on the other hand, the second clamp 14 is supported by the framework 13 with the capacity for translation parallel to a substantially horizontal plane (or, in other words, parallel to the ideal resting plane of the apparatus 2 and/or of the unit 1). Noting that the ideal plane is typically the ground or the floor of the building in which the unit 1 operates, the second clamp 14 is therefore free to move in the plane (as a result of two degrees of freedom of translation).

This is found to be of particular interest in that it enables the guiding device 6 to adapt rapidly to changes in format of the conductive elements A to be transferred and inserted into the slots C.

The translation in practice can be achieved in any manner, for example by availing of motors associated with entrainment chains 15 or belts.

The unit 1 can also advantageously comprise a pusher, not shown in the accompanying figures but configured according to any embodiment that the person skilled in the art would be able to deem adequate for the purpose: the pusher can be detachably arranged in the area above the collection tool D and is capable of translation along a vertical axis (perpendicular to the resting surface of the apparatus 2 and/or of the collection tool D) in order to apply a pressure on the element A that was previously inserted into the destination slot(s) C and force it into the slot C. The pusher can therefore move in order to be brought temporarily above the destination slot C after the element A has been (partially) inserted and after the clamps 3, 14 have been moved, in order to push the element A downward by acting, for example, on the connecting bridge.

As already anticipated, the subject matter of the present discussion is not only the unit 1 described up to this point, but also a method 100 for transferring conductive elements A (for example of inductive coils), which can be carried out using the unit 1 and which comprises (or which consists of) the steps explained below.

According to the invention therefore, the method 100 consists first of all, in a step a., in gripping (picking up) with a first clamp 3 for locking a (segment of a) conductive element A supplied by a delivery (and/or forming) station B. FIG. 1 in fact shows the element A just after it has been gripped by the first clamp 3 in step a.; evidently, the element A which up to that moment had been suitably held by the station B is here handed over to the first clamp 3 (to the unit 1).

Subsequently, in a step b., the method 100 translates the element A, clamped by the first clamp 3, in order to move it away from the delivery station B (to move it from the bulk of that station and bring it closer to the collection tool D). The translation in step b. is typically horizontal (parallel to the ideal resting plane of the unit 1). At the end of step b., the unit 1 is in the state shown in FIG. 2.

Therefore, in a step c., the method 100 consists in rotating (preferably by) 90° the element A locked by the first clamp 3 about a rotation axis H at least until a portion of interest thereof is aligned with a specific destination slot C provided in the collection tool D that is provided with a plurality of slots C arranged according to a predefined distribution. The rotation in step c. is typically obtained by making the arm 5 that supports the first clamp 3 rotate, and brings the unit 1 to the state shown in FIG. 3.

Subsequently, in a step d., the method 100 consists in translating the element A locked by the first clamp 3 in order to move it progressively closer to the collection tool D.

Preferably, such step d. is executed while taking care to convey in the meantime the element A by way of the guiding device 6.

The guiding device 6 can have been previously arranged above the tool D, while executing step c. (or even before then), bringing the second jaws 14*a* to the second arrangement.

In any case, during step d. and while the element A is clamped with a first segment A' by the first clamp 3, the guiding device 6 is responsible for conveying typically a second segment A" into the corresponding destination slot C, as in FIG. 5 for example. At the end of step d., typically at least one end of the element A has entered the destination slot C and preferably two ends of two different portions; if in fact the element A is a hairpin (or the like), typically step d. is considered concluded when both of the tines have entered respective slots C.

As already noted, the correct positioning of the tines of the hairpin (and therefore their optimal insertion into the slots C) is ensured in this step, for one tine, by the clamping performed by the first clamp 3, while for the other tine it is ensured by the duct 7 of the guiding device 6.

Then the method 100, in a step e., entails inserting (or completing the insertion of) at least one portion (of interest) of the element A into the destination slot(s) C (FIG. 8), translating the first clamp 3 further if necessary, and releasing the element A from the first clamp 3 (FIG. 10), effectively completing the desired transfer. Again it is noted that for a hairpin the step e. consists in inserting two portions of interest (two tines) into respective slots C.

According to the invention furthermore, steps b. and d. of translation take place along a sliding direction K that lies on a plane perpendicular to the rotation axis H. More specifically, preferably the translation performed in step d., in approach to the collection tool D, is perpendicular to the translation performed in step b., away from the delivery station B.

Steps d. and e. therefore entail the vertical (perpendicular to the ideal resting plane) translation, downward, of the first clamp 3.

For the optimal execution of step e., the second clamp 14 is brought from the second arrangement to the first arrangement (the second jaws 14*a* are opened in order to allow the transit of the first clamp 3) and finally (obviously) the first jaws 12 are also opened in order to release the element A in the slot C.

More specifically, the method 100 also consists, in a step a'. which precedes step a., in translating (horizontally) the first clamp 3 in order to move it closer to the delivery station B; furthermore, the method 100 also consists, in a step e' which follows step e., in translating (vertically) the first clamp 3 in order to move it away from the collection tool D, and, in a step f. which follows step e', in rotating (preferably by) 90° the first clamp 3 until it is aligned (once again) with the delivery station B, so that the sequence of steps is a'., a., b., c., d., e., e'., f. Steps a'., a., b., c., d., e., e'., f. together effectively define a complete cycle of transfer and insertion of an element A into at least one corresponding destination slot C, at the end of which the initial conditions are restored and a new cycle can be begun.

It should be noted that such method 100 is typically repeated until there is a "pack" of elements A on the tool D, according to a well-defined geometry: typically, the pack is subsequently taken and coupled to a ferromagnetic core in order to provide a desired winding.

It should likewise be noted that, at the end of step e. it is also possible to use a pusher, in the manner explained in the foregoing pages, in order to facilitate/force the complete insertion (or at least, up to the desired height) of the element A into the destination slot(s) C.

As has been partially anticipated, in the preferred application (of the unit 1 but also) of the method 100 according to the invention, the conductive element A is a hairpin and is shaped like a fork comprising two tines and a transverse connecting bridge. In such context, step a. of the method 100 consists in gripping the element A at one of such tines, which will need to be inserted at least partially into a first destination slot C, while step d. entails the conveyance, via a guiding device 6, of the other tine into a second destination slot C, different from the first C.

More specifically, step d. can entail conveying the other tine via a guiding device 6 that comprises a supporting framework 13 for a second clamp 14, for conveyance. The latter comprises a pair of second jaws 14*a* which can move with respect to each other between a first arrangement, in which they are mutually spaced apart, and a second arrangement, in which they are arranged in mutual contact at least with respective active fractions which comprise, along corresponding mutually facing inner profiles, contoured recesses that are adapted jointly to define, in the second arrangement, the funnel-shaped through duct 7.

The operation of the unit according to the invention is evident from what is described up to this point, but a brief summary is given below in any case.

The unit 1 is responsible for picking up a conductive element A (one at a time) from a delivery station B: the station B and the stations upstream are typically capable of cutting the element A from a continuous skein and shaping it appropriately (for example like a "hairpin"), holding it until the unit 1 picks it up and proceeds to move it.

In this context therefore, the first clamp 3 of the unit 1 performs a translational motion (horizontally) toward the delivery station B (along the sliding direction K) in order to then pick up the element A by clamping it (the station B can then release it): subsequently, the first clamp 3 performs a translational motion (horizontally) in the opposite direction in order to move away from the bulk of the station B and, starting to move toward the tool D, begins to rotate.

The unit 1 in fact has to deliver the element A to the tool D, taking care to slide at least one portion thereof into a destination slot C of the tool D (for a hairpin, a single tine is clamped by the first clamp 3 but both tines need to be slid into respective slots C).

The rotation of the arm 5 about the rotation axis H brings the first clamp 3 and each portion of interest of the element A into alignment with a corresponding destination slot C; once alignment is achieved, the first clamp 3 again performs a translational motion toward the tool D (vertically downward, along the sliding direction K) until the element A (each portion of interest thereof) is deposited into the destination slot(s) C.

In order to ensure a correct insertion, the through duct 7 of the guiding device 6 is preferably arranged above the slot C and along the sliding direction K, and by virtue of its funnel shape it makes it possible to convey the element A (a second portion of interest, typically different from the portion actively clamped by the first clamp 3) into the slot C.

In such context, the duct 7 is constituted by a second clamp 14, which is closed (as needed) in a second arrangement before the transit of the element A (in order to perform the conveyance) and which is opened afterward (returning to the first arrangement) in order not to interfere with the subsequent transit of the first clamp 3.

So as anticipated, by taking care to properly align the delivery station B (the pickup point of the element A) with the destination slot C, it is possible to optimally transfer the element A without using complex and cumbersome robots (as happens in conventional solutions), but simply by using a first clamp 3 provided with only two degrees of freedom (one of rotation and one of translation) and, optionally, using the guiding device 6.

The few and simple movements necessary for the transfer also ensure the containment of the associated cycle time and in particular they ensure a reduction in the latter, with respect to conventional solutions.

In practice it has been found that the unit 1 and the method 100 according to the invention fully achieve the set aim and objects, in that the first clamp 3 (provided with two degrees of freedom) and, optionally, the guiding device 6 make it possible to optimally and quickly transfer conductive elements A (for example of inductive coils), thus reducing the cycle time with respect to conventional solutions.

The picking up and depositing of the elements A is obtained with components (the movement apparatus 2 of the first clamp 3 and, optionally, the guiding device 6) which have contained bulk and purchase cost, certainly less than those associated with the robots in conventional solutions.

The choice to convey the insertion with the guiding device 6 ensures maximum precision and reliability, in this regard obtaining performance levels that are wholly comparable to, if not superior than, those that can be obtained with conventional solutions (but with the advantages just described).

It should be noted that the first locking clamp 3 can easily clamp one hairpin at a tine thereof, or a straight, mixtilinear or curvilinear element A at any segment thereof and, more generally, it can easily grip and transfer conductive elements A (wire-like or otherwise) of any shape and size, thus ensuring maximum versatility for the invention.

If the shape and/or the dimensions vary, it is sufficient to recalibrate the stroke set for the first clamp 3 and also the position and/or the stroke of the duct 7, taking care optionally to modify the position of the collection tool D.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The disclosures in Italian Patent Application No. 102021000028328 from which this application claims priority are incorporated herein by reference.

The invention claimed is:

1. A transfer unit for transferring conductive elements said transfer unit comprising:

- a first locking clamp configured to pick up and retain athe conductive element from a delivery station, the first locking clamp comprising a first pair of jaws,
- a rotating arm; coupled to the first locking clamp and configured to rotate about a main rotation axis between a first position, in which said first locking clamp is positioned proximate to the delivery station, and a second position, in which said first locking clamp is positioned proximate a collection tool having a plurality of slots arranged according to a predefined distribution, a carriage assembly on which the first locking clamp is mounted, the carriage assembly being configured to translate along a sliding direction lying in a plane perpendicular to said main rotation axis, and
- a second locking clamp positionable along said sliding direction when said rotating arm is in the second position, the second locking clamp comprising a second pair of jaws movable relative to each other between an open position and a closed position, wherein in said closed position the second pair of jaws cooperate to define a passage configured to direct the conductive element into a destination slot of the collection tool.

2. The transfer unit according to claim 1, further comprising:

- a first actuator configured to rotate said rotating arm about the main rotation axis; and
- a second actuator independent of said first actuator and configured to translate said carriage assembly along the sliding direction, wherein the carriage assembly is slideably coupled to said rotating arm and rigidly supports said first locking clamp.

3. The transfer unit according to claim 2, wherein said carriage assembly is operably coupled to said second actuator via a rack-and-pinions gear assembly.

4. The transfer unit according to claim 1, wherein said first pair of jaws are movablewhich e ect relative to each other between an open position, in which the first pair of jaws are spaced apart, and a closed position, in which said first pair of jaws clamp the conductive element therebetween.

5. The transfer unit according to claim 4, wherein the conductive element is fork-shaped, comprising a first segment and a second segment connected by a transverse bridge and arranged parallel to each other, and wherein an inner surface of at least one of said first pair of jaws, facing the other of said first pair of jaws, defines a recess configured to receive the second segment of the conductive element with clearance in the closed position while the first segment of the conductive element is clamped between said first pair of jaws.

6. The transfer unit according to claim 1, further comprising a pusher removably positionable above the collection tool, said pusher being configured to translate along a vertical axis to apply pressure to the conductive element partially inserted into the destination slot and to fully seat said conductive element in the destination slot.

7. The transfer unit according to claim 1, wherein said second locking clamp is translatable parallel to a horizontal plane.

8. The transfer unit according to claim 1, wherein said main rotation axis is stationary.

9. The transfer unit according to claim 1, wherein when the second pair of jaws are in the closed position, the second pair of jaws are in mutual contact along respective mutually facing inner surfaces, the inner surfaces comprising recesses that cooperate to define a funnel-shaped passage configured to receive and guide the conductive element into the destination slot.

10. A method for transferring conductive elements, the method comprising:

- a. gripping a conductive element supplied by a delivery station with a first locking clamp;
- b. translating the conductive element retained by the first locking clamp along a sliding direction away from the delivery station;
- c. rotating the conductive element retained by the first locking clamp about a main rotation axis until a portion of interest of the conductive element is aligned with a destination slot of a collection tool having a plurality of slots arranged according to a predefined distribution;
- d. translating the conductive element retained by the first locking clamp along the sliding direction toward the collection tool while directing the conductive element through a passage of a guide formed by a second locking clamp into the destination slot; and
- e. inserting at least the portion of interest of the conductive element into the destination slot and releasing the conductive element from the first locking clamp, wherein said steps b. and d. take place along thea sliding direction lying in a plane perpendicular to said main rotation axis.

11. The method according to claim 10, further comprising:

- a'. prior to step a., translating the first locking clamp toward the delivery station;
- e' subsequent to step e. translating the first locking clamp away from the collection tool; and
- f. subsequent to step e', rotating the first locking clamp about the main rotation axis until the first locking clamp is aligned with the delivery station, wherein the steps are performed in the following order: a'., a., b., c., d., e., e'., f.

12. The method according to claim 10, wherein the conductive element is fork-shaped comprising a first segment, a second segment, and a transverse bridge connecting the first segment and the second segment, the first segment and the second segment being substantially parallel to each other wherein step a. comprises gripping the first segment with the first locking clamp, the first segment being inserted partially into a first destination slot, and wherein step d. further comprises directing the second segment via the guide into a second destination slot of the collection tool, the second destination slot being different from the first destination slot.

13. The method according to claim 12, wherein said step d. further comprises directing the second segment through the guide comprising a support for the second locking clamp, the second locking clamp comprises a second pair of jaws movable relative to each other between an open position, in which the second pair of jaws are spaced apart, and a closing position, in which the second pair of jaws are in mutual contact along respective mutually facing inner surfaces, the inner surfaces comprising recesses that cooperate to define a funnel-shaped passage configured to receive and guide the second segment into the second destination slot.

14. The method according to claim 10, wherein the translation of step d. is perpendicular to the translation of step b.

* * * * *